United States Patent [19]
Turner

[11] 3,903,136
[45] Sept. 2, 1975

[54] DIHYDROXYOLEANDIENE DIESTERS

[75] Inventor: John Cameron Turner, West Wickham, England

[73] Assignee: Biorex Laboratories, Limited, England

[22] Filed: Mar. 29, 1973

[21] Appl. No.: 346,947

[30] Foreign Application Priority Data

Apr. 11, 1972 United Kingdom .............. 16665/72

[52] U.S. Cl. ......... 260/482 R; 260/410; 260/484 B; 260/483; 260/485 L; 260/486 R; 260/487; 260/488 B; 424/311; 424/312; 424/313; 424/314

[51] Int. Cl.² ..................... C07C 35/44; C07C 69/40; C07C 101/18; A61K 31/215

[58] Field of Search ........... 260/488 B, 485 L, 410, 260/487 R, 482, 488 B, 485 L, 410

[56] References Cited

UNITED STATES PATENTS

| | | | |
|---|---|---|---|
| 3,070,623 | 12/1962 | Gottfried et al. | 260/468.5 |
| 3,131,125 | 4/1964 | Wettstein et al. | 424/238 |
| 3,316,252 | 4/1967 | Ringold | 260/239.55 |
| 3,412,084 | 11/1968 | Turner et al. | 260/239 |

OTHER PUBLICATIONS

Mousseron–Canet et al., Bull. Soc. Chim. France, No. 1, pp. 245–249 (1969).

*Primary Examiner*—Donald G. Daus
*Assistant Examiner*—Diana G. Rivers
*Attorney, Agent, or Firm*—Wenderoth, Lind & Ponack

[57] ABSTRACT

New esters are obtained by the acylation of 3,30-dihydroxyolean-11,13(18)-diene with unsaturated alcohols. The new compounds have valuable anti-inflammatory properties.

6 Claims, No Drawings

DIHYDROXYOLEANDIENE DIESTERS

BACKGROUND OF THE INVENTION

It is known that glycyrrhetinic acid and many of its derivatives exhibit valuable therapeutic properties and, in particular, possess and anti-inflammatory activity. However, there is an obvious need to improve and/or modify the utility of glycyrrhetinic acid derivatives, for example, by potentiating existent activity or by modifying and altering the activity or by reducing undesirable properties, such as toxicity. One of the best ways to effect the activity of a pharmaceutically-active compound is to modify the molecule.

SUMMARY OF THE INVENTION

The new esters according to the present invention are compounds of the general formula:

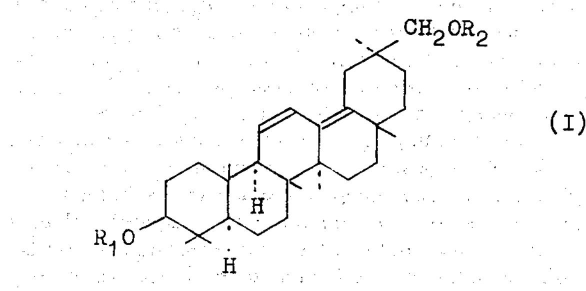

wherein $R_1$ and $R_2$, which may be the same or different, are acyl radicals derived from saturated or unsaturated, unsubstituted or substituted mono-, di- or polycarboxylic acids, and wherein any carboxylic acid groups present in $R_1$ and/or $R_2$ are optionally salified with non-toxic inorganic or organic bases.

DETAILED DESCRIPTION OF THE INVENTION

Examples of substituents which may be present in $R_1$ and $R_2$ include halogen atoms, amino groups and mono- and disubstituted amino groups, for example, cyclic amino, mono- and dialkylamino and mono- and diarylamino groups.

The radicals $R_1$ and $R_2$ each contain preferably up to 20 carbon atoms and more preferably up to 12 carbon atoms. Examples of acids from which the acyl radicals $R_1$ and $R_2$ can be derived include acetic acid, mono-, di-and trichloroacetic acid, mono-, di- and trifluoroacetic acid, propionic acid, butyric acid, caproic acid, palmitic acid, stearic acid, acrylic acid, crotonic acid, angelic acid, tiglic acid, oleic acid, geranic acid, linoleic acid, tetrolic acid, malonic acid, succinic acid, glutaric acid, sebacic acid, maleic acid, fumaric acid, tartronic acid, malic acid, oxalacetic acid, tartaric acid and citric acid.

The new glycyrrhetinic acids according to the present invention can be prepared by acylating the compound of the formula:

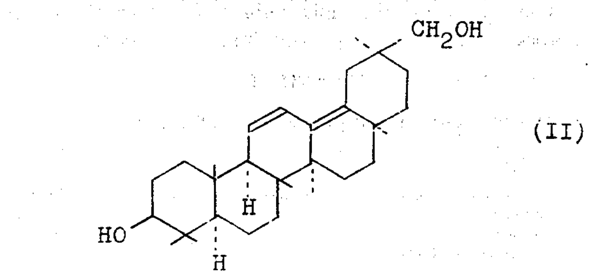

by methods of acylation in use or described in the literature.

Thus, the acyl derivatives may be prepared by using anhydrous carboxylic acids or the anhydrides thereof, preferably in the presence of an appropriate solvent at an elevated temperature. Acyl derivatives of polybasic organic acids in which at least one carboxylic acid group of the organic acid remains free, are preferably prepared by refluxing the organic acid with the compound (II) in an organic solvent or by reaction of an acid anhydride with the compound (II) in pyridine solution. Salts of such derivatives can be prepared by neutralisation with a non-toxic inorganic or organic base. As examples of non-toxic inorganic bases, there may be mentioned alkali metal and alkaline earth metal hydroxides, carbonates and bicarbonates. Specific examples of inorganic salts according to the present invention include the sodium, potassium, magnesium, calcium, aluminium, zinc, manganese and iron salts. As examples of non-toxic organic bases, there may be mentioned the aliphatic, aromatic and heterocyclic amines.

When the compounds obtained contain halogen in $R_1$ and/or $R_2$, these can, if desired, be reacted with ammonia or with a primary or secondary amine to replace the halogen atom by an unsubstituted or mono- or disubstituted amine group.

The following Examples are given for the purpose of illustrating the present invention:

EXAMPLE 1

1 g. 3,30-dihydroxyolean-11,13(18)-diene in 10 ml. pyridine was mixed with 10 ml. acetic anhydride. After leaving the reaction mixture to stand overnight at ambient temperature, thin layer chromatography showed that the acylation reaction was complete. The reaction mixture was then poured into water and extracted with ether. The ethereal extract was washed with an acid and then with water and thereafter dried, whereafter the ether was evaporated. The residue was recrystallised from methanol to give 3,30-diacetyl-olean-11,13(18)-diene, which had a melting point of 169°–170°C.

EXAMPLE 2

A solution of 10 g. 3,30-dihydroxy-olean-11,13(18)-diene in 500 ml. dry chloroform was cooled in an ice-bath to 0°C. To this were added 25 ml. N,N-diethylaniline, followed by the dropwise addition of 15 ml. chloroacetyl chloride. The reaction mixture was thereafter stirred for 6 hours at ambient temperature, the successively washed with water, dilute acid and aqueous sodium bicarbonate. After drying, the solvent was evaporated and the residue was taken up in 300 ml. benzene, filtered through a thick pad of 60 g. alumina and further eluted with 300 ml. benzene. After evaporation of the benzene, the residue was crystallised from a mixture of ethanol and chloroform to give 12 g. 3,30-di-(chloroacetyl)-olean-11,13(18)-diene, which had a melting point of 197°– 198°C.; $[\alpha]_D = -31°$(c. = 1% in chloroform).

EXAMPLE 3

A solution of 15 g. 3,30-dihydroxy-olean-11,13(18)-diene in 150 ml. pyridine was heated under reflux for 8 hours with 20 g. succinic anhydride. The reaction mixture was then poured into a mixture of dilute hydrochloric acid and ice and stirred for 15 minutes. The precipitate obtained was filtered off, washed with water, dried and dissolved in chloroform and ether (1:2). The solution was then treated with charcoal, filtered and concentrated. Upon cooling, 3,30-dihemisuccinyl-olean-11,13(18)-diene precipitated out. It was recrystallised from chloroform-ether and then had a melting point of 203°–204°C; $[\alpha]_D = -31°$(c. = 1 in chloroform). The yield was 11.5 g.

EXAMPLE 4

10.25 g. 3,30-dihemisuccinyl-olean-11,13(18)-diene (see Example 3) were suspended in 100 ml. methanol and mixed with a solution of 1.28 g. sodium hydroxide in 50 ml. methanol. The solution was then adjusted to pH 8 and diluted with 500 ml. acetone. The deposit obtained upon cooling was filtered off. There were thus obtained 10 g. 3,30-dihemisuccinyl-olean-11,13(18)-diene disodium salt, which had a melting point above 280°C. (dec.); $[\alpha]_D = -19°$(c. = 0.5 in methanol).

EXAMPLE 5

20 ml. lauroyl chloride were added, while cooling, to a solution of 6.5 g. 3,30-dihydroxy-olean-11,13(18)-diene in 50 ml. pyridine. The reaction was left to stand at 20°C. for 20 hours and at 80°C. for 30 minutes. After cooling, it was poured into a mixture of ice and hydrochloric acid, with vigorous stirring. The mixture was extracted with ether, the ethereal extract was washed with water and with an aqueous solution of sodium bicarbonate and dried and thereafter evaporated to dryness. The residual oil was taken up in 300 ml. petroleum ether, filtered through a column which had been filled with 250 g. alumina in petroleum ether and further eluted with 300 ml. petroleum ether. The eluate obtained was concentrated to a small volume and left to crystallise at −10°C. After further recrystallisations, there was obtained colourless and pure 3,30-dilauryl-olean-11,13(18)-diene, which had a melting point of 40°– 41°C.; $[\alpha]_D = -20°$ (c. = 1% in chloroform).

EXAMPLE 6

A mixture of 10.5 g. 3,30-di-(chloroacetyl)-olean-11,13(18)-diene (see Example 2), 3 g. sodium carbonate, 10 ml. diethylamine and 150 ml. benzene was heated under reflux, while stirring, for 7 hours and then left to stand overnight at ambient temperature. Water was added to the reaction mixture, the benzene layer was separated off and then washed with water, dried and evaporated to dryness. The residue was crystallised from a mixture of benzene and petroleum ether. After recrystallisation from the same solvent mixture, there were obtained 10.5 g. of colourless 3,30-di-(N,N-diethylaminoacetyl)-olean-11,13(18)-diene, which had a melting point of 127°– 128°C.; $[\alpha]_D = -30°$ (c. = 1% in chloroform).

EXAMPLE 7

A mixture of 8 g. 3,30-dihydroxy-olean-11,13(18)-diene and 400 ml. dry chloroform was cooled to 0°C. and 12 ml. trifluoroacetic anhydride were added dropwise, while stirring. When the addition was completed, 100 ml. cold water were added and, after 10 minutes, the chloroform layer was separated off, washed with an aqueous solution of sodium bicarbonate and water, dried and evaporated to dryness. The residue was crystallised from methanol to give 11 g. 3,30-di-(trifluoroacetyl)-olean-11,13(18)-diene, which had a melting point of 159°– 160°C.; $[\alpha]_D = -36°$(c. = 1% in chloroform).

The present invention also includes within its scope pharmaceutical compositions containing the new compounds of general formula (I). These pharmaceutical compositions can be administered orally or parenterally in admixture with a solid or liquid pharmaceutical carrier.

Solid compositions for oral administration include compressed tablets, pills, dispersible powders and granules. In such solid compositions, one of the new esters is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents, and sweetening and flavouring agents.

The compositions according to the present invention, for oral administration, include capsules of absorbable material, such as gelatine, containing one of the new derivatives, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic efect shall be obtained. In general, the preparations of the present invention should be administered orally ir parenterally to humans to give 10 to 1000 mg., preferably 50 – 500 mg. of active substance per day.

The following Examples illustrate pharmaceutical compositions according to the present invention:-

EXAMPLE 8

250 mg. tablets are prepared containing:

| | |
|---|---|
| 3,30-diacetyl-olean-11,13(18)-diene | 50 mg. |
| starch | 100 mg. |
| lactose | 95 mg. |
| magnesium stearate | 5 mg. |

EXAMPLE 9

400 mg. tablets are prepared containing:

| | |
|---|---|
| 3,30-hemisuccinyl-olean-11,13(18)-diene, disodium salt | 100 mg. |
| starch | 130 mg. |
| lactose | 160 mg. |
| magnesium stearate | 10 mg. |

The compositions according to Examples 8 and 9 are intended for oral administration to humans for the treatment of inflammatory conditions.

I claim:

1. A compound of the formula:

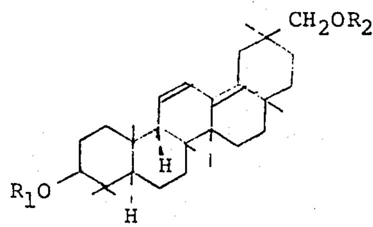

wherein $R_1$ and $R_2$ which may be the same or different are acetyl substituted by 1 to 3 chlorine or fluorine atoms, diethylamino or carboxymethyl, the carboxy group of which is free or is in the form of a non-toxic salt.

2. 3,30-Di-(chloroacetyl)-olean-11,13(18)-diene.

3. 3,30-Dihemisuccinyl-olean-11,13(18)-diene.

4. Disodium salt of 3,30-dihemisuccinyl-olean-11,13(18)-diene.

5. 3,30-Di(N,N-diethylaminoacetyl)-olean-11,13(18)-diene.

6. 3,30-Di-(trifluoroacetyl)-olean-11,13(18)-diene.

* * * * *